United States Patent [19]

Karol

[11] 4,376,960

[45] Mar. 15, 1983

[54] FLEXIBLE DISK STABILIZING STRUCTURE

[75] Inventor: Kenneth N. Karol, Tucson, Ariz.

[73] Assignee: International Business Machines Corporation, Armonk, N.Y.

[21] Appl. No.: 221,951

[22] Filed: Dec. 31, 1980

[51] Int. Cl.³ .................. G11B 5/016; G11B 5/82
[52] U.S. Cl. .................................. 360/99; 360/86
[58] Field of Search .............. 360/99, 98, 97, 86, 360/133, 135

[56] References Cited

U.S. PATENT DOCUMENTS

| | | | |
|---|---|---|---|
| 3,830,506 | 8/1974 | Ewert et al. | 274/39 A |
| 3,863,266 | 1/1975 | Hosino | 360/86 |
| 3,900,893 | 8/1975 | Hirose et al. | 360/99 |
| 4,003,091 | 1/1977 | Wright | 360/102 |
| 4,057,840 | 11/1977 | Wingo | 360/99 |
| 4,060,839 | 11/1977 | Meadows | 360/99 |
| 4,079,427 | 3/1978 | Mann | 360/99 |
| 4,159,494 | 1/1979 | Evans et al. | 360/133 |
| 4,208,683 | 6/1980 | Kleczkowski | 360/99 |

Primary Examiner—Alfred H. Eddleman
Attorney, Agent, or Firm—Walter J. Madden, Jr.

[57] ABSTRACT

A magnetic recording device for non-contact recording on a flexible disk employs a Bernoulli plate to stabilize the rotating disk. The plate is slightly concave and has a number of small orifices therein through which air is drawn by the disk rotation to produce a thin, cushion of air between the plate and the disk.

3 Claims, 4 Drawing Figures

FLEXIBLE DISK STABILIZING STRUCTURE

TECHNICAL FIELD

This invention relates to data storage apparatus of the type comprising a flexible record disk mounted for rotation relative to a stationary Bernoulli surface.

BACKGROUND ART

Present systems for magnetic recording on flexible disks require a platform on which a rotating disk can be supported. A disk rotating near a stationary plate interacts with it in such a manner that if a source of air flow is provided at the disk's axis, an attractive force is created between them. This Bernoulli coupling force between disk and plate provides the means for repetitively and effectively positioning the rotating disk relative to the stationary plate. Positioning is achieved because of a balance of inertial, internal, external and fluid dynamic stresses created at the plate-disk interface (PDI). As a result of this balance of stresses, a plate-to-disk separation $S = S (R, W, Q, V)$ is established which is a function of various system parameters, including $R$ = disk radial coordinate, $W$ = rotational frequency, $Q$ = air source flow rate and $V$ = fluid kinematic viscosity.

In a flexible disk non-contact recording system, a recording head or transducer is required to protrude into the plane of the disk in order to achieve transducer-disk spacings which permit digital recording at desired high bit densities. Such protrusions create local instabilities in the PDI, which in turn affects the head-to-disk spacing. The head preferably incorporates a ring stabilizer device such as described and claimed in U.S. Pat. No. 4,003,091, assigned to the same assignee as the present application, which through its fluid dynamic interaction with the rotating disk, acts to pull the disk into its vicinity, and also acts to damp out PDI instabilities which would have been created had the disk-stabilizer effects not been present. In such a Bernoulli-type recording system, the transducer remains spaced from the disk surface, unlike other flexible disk recorders in which the transducer is in contact with the disk surface.

In previous Bernoulli-type recording devices, it has been necessary to employ flat Bernoulli plates made to relatively close tolerances, such as ±0.0015 inches, in order to obtain satisfactory performances. This requirement for such close tolerances on flatness understandably increases the cost of manufacturing the devices and makes such devices less attractive, particularly since these devices are intended primarily as low cost products.

PRIOR ART

U.S. Pat. No. 3,863,266 shows a contact-type recorder in which a flexible disk is located between a pair of support plates, the support plate on the opposite side of the disk from the transducer being extensively perforated and conically dished.

U.S. Pat. No. 3,830,506 discloses a stiffened flexible disk which rotates on an air film above a concave rigidizing surface. A radially movable transducer accesses the concavely curved cylindrical surface of the disk (i.e., the surface remote from the stabilizing surface).

U.S. Pat. No. 4,057,840 discloses a disk cartridge which provides a convexly curved cylindrical surface. A drive spindle has axially extending drive pins that enter holes in a flexible disk to rotate the disk.

U.S. Pat. No. 4,159,494 discloses a cartridge having non-planar Bernoulli surfaces for each of the recording disk surfaces so that both sides of the disk may be used by inserting the cartridge in a drive spindle in either of two positions.

Copending application Ser. No. 160,757, filed June 18, 1980, and assigned to the same assignee as the present application, discloses a flexible magnetic recording disk disposed between two Bernoulli stabilizing plates, and a transducing head extends through an opening in each Bernoulli plate to be positioned closely adjacent each stabilized surface of the disk.

SUMMARY OF THE INVENTION

In accordance with the present invention, a Bernoulli-type recording device is provided which does not require the close flatness tolerances of prior devices. In the present invention, the Bernoulli plate can range in concavity in a direction parallel to the path of movement of the transducer and is provided with a small number of small orifices through which air may be drawn. By allowing the proper amount of air to be drawn into the space over the full surface between the disk and the Bernoulli plate, the flatness of the plate is not critical. When the disk rotates, air is sucked into the orifices from the underside of the plate and distributed as a dynamically flowing cushion between the disk and the plate surface by the staggered position of the orifices. In so doing, a cushion of air is created which allows control of the head-to-disk surface relationship to be taken over by the ring stabilizer and transducer and stabilized.

DESCRIPTION OF THE BEST MODE

AND

INDUSTRIAL APPLICABILITY

Figure 1:
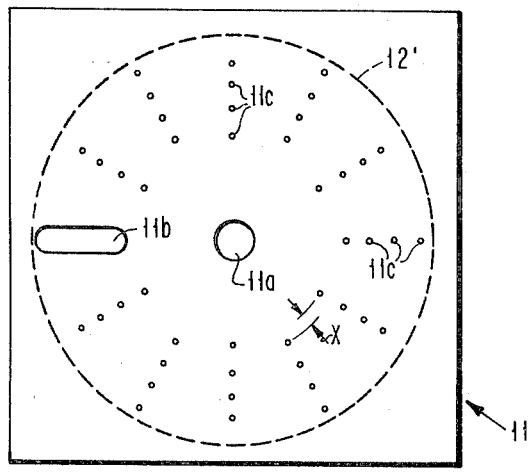
FIG. 1 is a plan view of a Bernoulli plate structure in accordance with the present invention.

Referring to FIG. 1, reference numeral 11 identifies a Bernoulli plate in accordance with the present invention. Plate 11 may be generally rectangular in configuration as shown and is provided with a central opening 11a for providing a closely fitting driving connection to a flexible disk from a drive motor not shown, disposed behind or below plate 11. The position of such a flexible disk relative to plate 11 is represented by the dotted outline 12' in FIG. 1. A transducer is movable in a slot 11b radially of plate 11 to permit the transducer to cooperate with different concentric record tracks on the flexible magnetic disk, as is well known in the art.

In accordance with this invention, plate 11 is also provided with a small number of small orifices 11c through which air may be drawn when the flexible disk is rotating, the air forming a cushion between the flexible disk and Bernoulli plate 11. For ease of manufacture, openings 11c may be disposed on lines extending radially from the center of plate 11, as shown in FIG. 1. To insure a cushion of air between the disk and Bernoulli plate 11, orifices 11c in adjacent radial lines are offset from each other radially, this offset being represented by X in FIG. 1.

Figure 2:
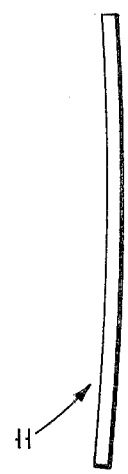
FIG. 2 is a side view of this structure illustrating the concavity of the plate.

An important feature of the present invention is that plate 11 is provided with a slight concavity on its surface facing the flexible disk. This is shown in FIG. 2, with the concavity extending through opening 11b. It will be understood that the concavity shown in FIG. 2 is exaggerated for illustrative purposes.

Figure 3:
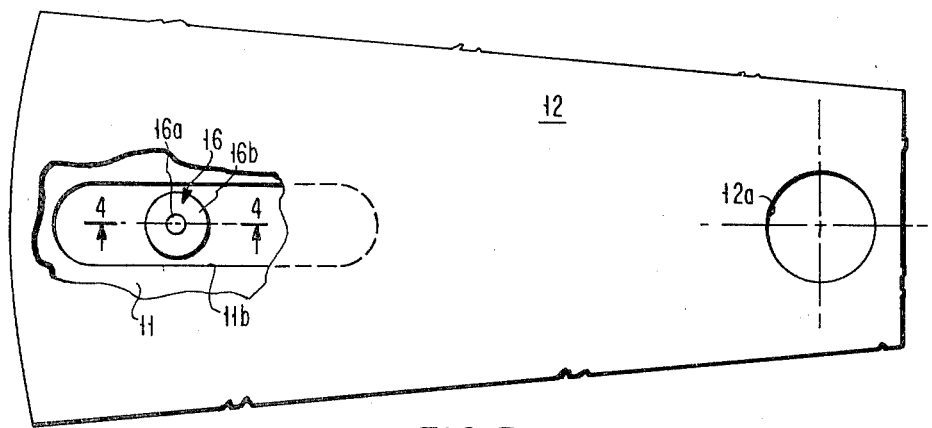
FIG. 3 is a plan view, partly in section, illustrating the operation of the Bernoulli plate of the present invention to control a flexible disk in conjunction with a stabilizing transducer.
Figure 4:
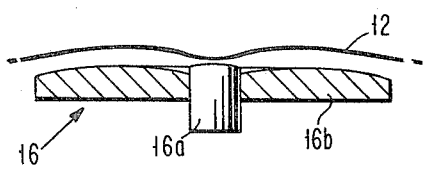
FIG. 4 is a cross-sectional view along plane 4—4 of FIG. 3 showing further details of the stabilizing action.

FIG. 3 illustrates the operating relationship between the flexible disk, transducer and Bernoulli plate 11. A flexible disk 12 is mounted above plate 11 and is connected at its center by clutch means through 12a to a drive motor whose driving connection extends through opening 11a in plate 11. To magnetically read or write on disk 11, a transducer 16 is provided which extends through opening 11b in plate 11 is movable radially of disk 12 by means not shown, to position the transducer adjacent different concentric record tracks of disk 12. As discussed above, transducer 16 is preferably of the ring stabilizer type described in U.S. Pat. No. 4,003,091. Such a ring stabilizer transducer operates to pull the flexible disk toward the transducer and to provide a stable transducer-to-disk relationship. This attraction and stabilizing action is illustrated in FIG. 4, which shows disk 12 drawn toward stabilizer transducer 16, but spaced therefrom for non-contact recording stabilizer transducer 16 includes a central transducer portion 16a and a surrounding stabilizing ring 16b.

Orifices 11c allow the proper amount of air to enter the space between disk 12 and the Bernoulli plate 11 so that the flatness of the plate is not critical. In so doing, a cushion of air is created which allows control of the transducer-to-disk surface relationship to be taken over by ring stabilizer transducer 16 and stabilized. When the disk rotates, air is drawn into orifices 11c from the underside of plate 11 and distributed as a cushion between disk 12 and the plate surface, the staggered or offset relationship of orifices 11c in adjacent radial lines helping to minimize turbulence and insure such an air cushion.

A number of plates having different amounts of concavity were fabricated and assembled into cartridges for testing. The amount of concavity in the different plates extended all the way to 0.5 mm, and all performed satisfactorily. In these tests, Bernoulli plates having a thickness of 1.37 mm were provided with 43 orifices 11c having a diameter of 2.0 mm and spaced from each other on 30 degree radial lines as illustrated in FIG. 1 by a distance of 10.0 mm. The flexible disk was rotated at a speed of 1580 rpm and a ring stabilizer transducer as shown in U.S. Pat. No. 4,003,091 was employed. These tests indicated an excellent disk-to-head relationship and stabilized operation of the flexible disk in non-contact operation, with a disk to transducer spacing in the order of microinches.

It will be understood that in actual use, the Bernoulli plate may be placed in a cartridge for mounting of a flexible disk drive provided with a motor for rotating disk 12, and with an actuator for moving transducer 16 to different concentric tracks on disk 12.

I claim:

1. Apparatus for magnetically recording and reproducing electrical signals, comprising
    a flexible disk having a magnetic recording material on at least one surface thereof;
    a Bernoulli plate member positioned adjacent said disk surface having the magnetic recording material thereon;
    said plate member being concave in one direction and having a plurality of orifices therein through which air is drawn when said disk is rotating;
    said orifices being aligned radially outwardly from the center of said plate member, adjacent radial lines of said orifices being offset radially from each other,
    said plate member having a transducer opening therein for location of transducing means to magnetically cooperate with said disk in a non-contact transducing relationship.

2. Apparatus in accordance with claim 1, in which said transducing means is movable, said plate member being concave in the direction of movement of said transducing means.

3. Apparatus in accordance with claim 1, in which said transducing means is movable, basically parallel to the trough of the concavity, said concavity being normal to the movement of the transducing means, said plate member being concave in the direction of movement of said transducing means.

* * * * *